July 14, 1964     A. L. JOHNSON     3,141,088

ELECTRIC SOLDERING IRON

Filed Sept. 10, 1962

INVENTOR.
Arthur L. Johnson,
BY Richards & Cifelli,
Attorneys 3,141,088
ELECTRIC SOLDERING IRON
Arthur L. Johnson, Roselle Park, N.J., assignor, by mesne assignments, to Hexacon Electric Company, Roselle Park, N.J., a corporation of New Jersey
Filed Sept. 10, 1962, Ser. No. 222,486
2 Claims. (Cl. 219—236)

This invention relates to improvements in electric soldering irons, and, more particularly, to irons of small size adapted for use in micro-electronic and similar soldering operations wherein the iron is maintained energized and hot over long periods of time. Under such conditions, the handle of the iron tends to become uncomfortably hot in the grasp of the operator.

It is an object of this invention to provide a novel construction of electric soldering iron, especially of the type above referred to, wherein means is provided for substantially preventing conduction of heat, generated by the iron in use, to its handle, including means to reflect heat away from said handle, while at the same time providing means for air circulation relative to the heat reflecting means and handle to thereby enhance heat dissipating effect, thus maintaining the handle relatively cool and therefore more comfortable to the grasp of the operator.

A further object of this invention is to provide the iron with a novel form of handle member having a finger grip section, which affords cooling air spaces between the same and the grasping fingers of the user.

Another object of this invention is to provide an electric soldering iron, of the type referred to, which is of short overall length for ease of handling, so that operator fatigue is avoided; and wherein the distance between the point of contact with the work and operator's hand is short, whereby wavering of the iron tip relative to its point of application to the work is reduced to a minimum, and accuracy of such application is facilitated.

The above, and other objects of this invention not at this time more particularly enumerated, will be understood from a reading of the following description of an illustrative embodiment of this invention in connection with the accompanying drawings thereof, in which drawings.

Like characters of reference are employed in the above described views, to indicate corresponding parts.

Figure 1:
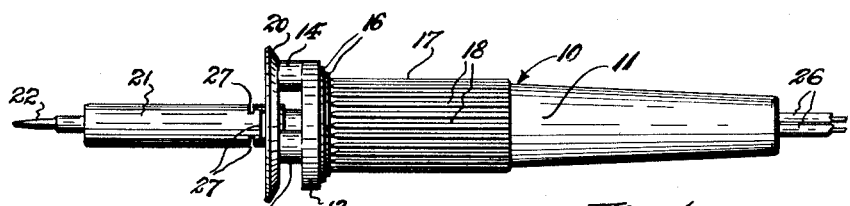
FIG. 1 is a side elevational view of an electric soldering iron according to this invention.
Figure 2:
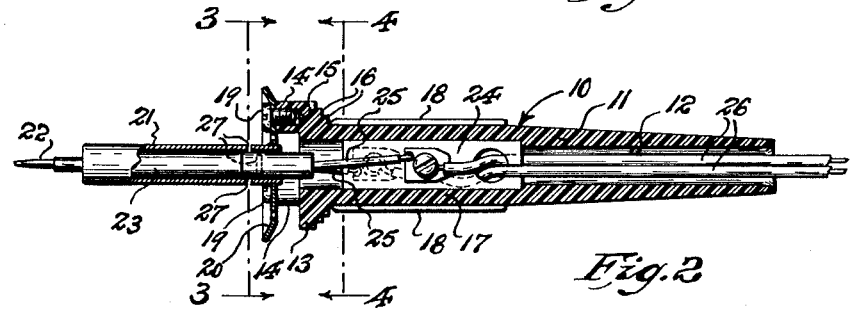
FIG. 2 is a longitudinal sectional view of the same.
Figure 3:
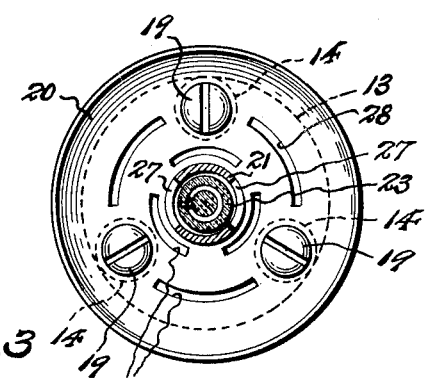
FIG. 3 is an enlarged cross-sectional view, taken on line 3—3 in FIG. 2.
Figure 4:
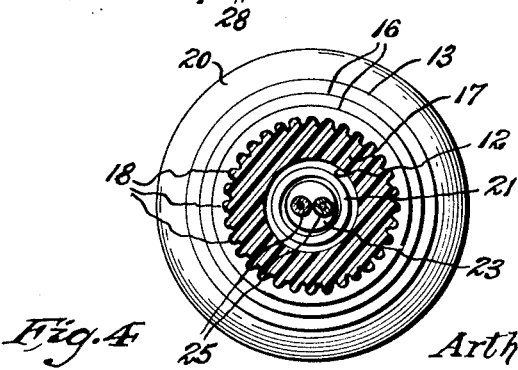
FIG. 4 is another enlarged cross-sectional view, taken on line 4—4 in FIG. 2.

Referring now to said drawings, the reference character 10 indicates the handle member of a soldering iron according to this invention. This handle member is preferably made from a low density thermoplastic material of low thermal conductivity. This handle member comprises an elongated body 11 of preferably circular cross-sectional shape, having an axial bore 12 extending therethrough from end to end. The body 11 terminates at its forward end in a diametrically enlarged annular head 13. Projecting forwardly from the front face of this head 13, as integral parts of the same, are a plurality of circumferentially, spaced apart offsetting studs 14, each having internally screw-threaded openings 15 extending thereinto from their outer free ends. Formed in connection with the rear face of the head 13 are a plurality of concentrically spaced successive annular shoulders 16, which provide an increased surface area exposed to the cooling effect of surrounding air. The forward portion of the handle member body 11, immediately behind the head 13, provides a finger grip section 17, the external surface of which is formed to provide a plurality of longitudinally extending, radially projecting spaced apart ribs 18, which provide intermediate cooling air spaces between the finger grip section 17 and grasping fingers of the user.

Affixed to the offsetting studs 14, by fastening screws 19 engaged in the threaded openings 15 thereof, is a concavo-convex heat reflector member 20, which is thus disposed parallel to and in outwardly spaced away relation to the head 13 of the handle member 10, with its concave face forwardly presented. This heat reflector member 20 is preferably made of stainless steel, with at least its forwardly presented concave face highly polished to a mirror finish, whereby to enhance its heat reflective effect.

Affixed to the heat reflector member 20, to extend forwardly from the center thereof, and in axially aligned relation to the handle member 10, is the hollow barrel or stem 21 of the soldering iron. Connected to and projecting from the outer end of this barrel or stem 21 is a soldering tip member or element 22 of selected shape. Supported within the interior of the barrel or stem 21, in heat transfer relation to the soldering tip member or element 22 as well known to the art, is an electrical heating element 23.

Supported within the bore 12 of the handle member body 11 is any suitable form of electrical connection means 24 by which the leads 25 of the heating element 23 are connected with the electrical current service conductors 26, which lead, from a source of electrical energy and extend into rear end of the bore 12 of the handle member body to said connecting means 24.

From the above it will be apparent that the barrel or stem 21, with its soldering tip member or element 22 and its contained heating element 23, is disposed forwardly of and in exteriorly offset spaced away relation to the handle member 10, and thus in minimum heat conductive relation to the latter, since its only connection therewith is through the heat reflector member 20 and the offsetting studs 14 of said handle member head.

Since the heat reflector member 20 is positioned behind the forwardly extending barrel or stem 21 and its contained heat generating element 23, heat radiated from the latter while the iron is energized will be deflected by said reflector member forwardly and outwardly away from the handle member 10.

It will be observed that the reflector member 20 is also spaced away from the head 13 of the handle member by the offsetting studs 14, so that air space intervenes, thus permitting heat to radiate to the surrounding atmosphere. Said offsetting studs 14 being the only direct connection between the reflector member 20 and the barrel or stem 21 and its contained heating element 23, it will be obvious that said studs offer but a limited path of heat conduction to the handle member 10, and, furthermore, said studs are surrounded by cooling air so that much of the heat tending to pass through the studs and screws 19 to the handle member will be dissipated before reaching the latter.

As a result of all this, it will be obvious that the handle member 10 remains relatively cool and comfortable to the grasp of the user of the iron, especially during long periods of uninterrupted energization of the iron.

To further assist the dissipation of heat of the energized iron before any substantial amount thereof can reach the handle member 10, the rear end portion of the barrel or stem 21, forwardly of the reflector member 20, is provided with a pluality of staggered transverse slots or openings 27, thus diminishing the area of direct conduction of heat to the reflector member 20, while at the same time allowing direct transfer of heat to the air in front of the reflector member subject to deflection thereby away from the handle member 10.

It is desirable, but not necessarily essential, to provide the reflector member 20 with concentric rows of arcuate slots or openings 28, thus allowing air circulation relative thereto, whereby to diminish direct transfer of heat to the supporting screws 19, and also tending to keep the margins of the reflector member relatively cool to finger touch.

It will be further observed that the novel construction of the soldering iron according to this invention, permits the overall length thereof to be short for easy handling by the operator in use without undue fatigue, while at the same time the barrel or stem 21 and its soldering tip 22 can also be of short length, so that the distance between the point of application of soldering tip to the work and the finger grip section 17 of the handle member is likewise short, and consequently tendency to wavering of the soldering tip relative to said point of application thereof to the work is substantially diminished, thus facilitating accurate and less tiring manipulation of the iron in use.

Having now described my invention, I claim:

1. An electric soldering iron comprising a handle member having a diametrically enlarged annular head at its forward end and provided with a plurality of circumferentially spaced apart offsetting studs projecting from its forward face, the head of said handle member having at its rear face a series of concentrically spaced, rearwardly offset, successive annular shoulders adapted to increase its area of heat radiating and dispersing surface, said handle member having a finger grip section extending rearwardly behind its head, said grip section having an external surface comprising a plurality of longitudinally extending, radially projecting spaced apart ribs to provide for heat dissipating air circulation between said grip section and the grasping hand of the iron user, a concavo-convex reflector member affixed to and supported by said studs in outwardly spaced away parallel relation to said handle member head, the diameter of said reflector member being greater than the diameter of said head, said studs providing both a reduced path of direct heat conduction toward said handle member as well as air circulation space between said reflector member and the latter, said reflector member having its concave face highly polished and forwardly presented, to thereby reflect heat away from said handle member, all whereby heat radiation, reduced heat conduction and heat reflection are induced relative to the handle member, including air circulation relative to the reflector member to further enhance heat dissipation, a hollow barrel unitary with and projecting forwardly from and in axially aligned relation to said handle member and through said reflector member, a soldering tip affixed to the free end of said barrel, an electric heating element housed in said barrel forwardly of the reflector member and in heat transfer relation to said soldering tip, said handle member having an axial bore extending therethrough, and conductor means extending through said bore to operatively connect said electric heating element with a source of electrical energy.

2. An electric soldering iron according to claim 1, wherein the body of the reflector member is provided with concentrically spaced rows of arcuate air circulation openings extending therethrough, and the wall of the barrel is provided, adjacent to its attachment to and forwardly of the reflector member, with a plurality of staggered heat venting openings.

References Cited in the file of this patent

UNITED STATES PATENTS

| | | |
|---|---|---|
| 1,927,570 | Lofthouse | Sept. 19, 1933 |
| 2,031,532 | Goldman | Feb. 18, 1936 |
| 2,252,538 | Young | Aug. 12, 1941 |
| 2,257,376 | Grey | Sept. 30, 1941 |
| 2,667,561 | Schoenwald | Jan. 26, 1954 |
| 2,763,762 | Jepson | Sept. 18, 1956 |
| 3,048,687 | Knowles | Aug. 7, 1962 |

FOREIGN PATENTS

| | | |
|---|---|---|
| 560,806 | Great Britain | Apr. 20, 1944 |